(12) United States Patent
Matsubayashi et al.

(10) Patent No.: US 7,614,690 B2
(45) Date of Patent: Nov. 10, 2009

(54) HEADREST CONTROL APPARATUS AND METHOD

(75) Inventors: Kiyoka Matsubayashi, Aichi-ken (JP); Motomi Iyoda, Seto (JP); Tatsuhiro Okawa, Toyota (JP); Takaya Aiyama, Anjo (JP)

(73) Assignees: Toyota Jidosha Kabushiki Kaisha, Toyota-shi, Aichi-ken (JP); Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 106 days.

(21) Appl. No.: 11/892,538

(22) Filed: Aug. 23, 2007

(65) Prior Publication Data

US 2008/0067841 A1 Mar. 20, 2008

(30) Foreign Application Priority Data

Aug. 23, 2006 (JP) ............................ 2006-226837

(51) Int. Cl.
*B60N 2/42* (2006.01)

(52) U.S. Cl. ................................ 297/216.12; 296/68.1

(58) Field of Classification Search ............. 297/216.1, 297/216.12, 408, 410; 296/68.1
See application file for complete search history.

(56) References Cited

U.S. PATENT DOCUMENTS

| | | | |
|---|---|---|---|
| 5,694,320 A | 12/1997 | Breed | |
| 6,176,543 B1 * | 1/2001 | Nawata et al. | 296/68.1 |
| 6,196,580 B1 * | 3/2001 | Eberle et al. | 280/735 |
| 6,523,892 B1 * | 2/2003 | Kage et al. | 297/216.13 |
| 6,604,788 B1 * | 8/2003 | Humer | 297/216.13 |
| 6,666,292 B2 * | 12/2003 | Takagi et al. | 180/274 |
| 7,017,989 B2 * | 3/2006 | Yamaguchi et al. | 297/216.12 |
| 7,164,117 B2 * | 1/2007 | Breed et al. | 250/221 |
| 2006/0208169 A1 * | 9/2006 | Breed et al. | 250/221 |

(Continued)

FOREIGN PATENT DOCUMENTS

DE 603 01 591 6/2006

(Continued)

OTHER PUBLICATIONS

Partial translation of JP-A-2006-321450.

(Continued)

*Primary Examiner*—David Dunn
*Assistant Examiner*—Erika Garrett
(74) *Attorney, Agent, or Firm*—Finnegan, Henderson, Farabow, Garrett & Dunner, LLP (57) ABSTRACT

A headrest control apparatus has a rear radar sensor, a PCS-ECU, a headrest drive mechanism that supports a headrest and drives the headrest relative to the vehicle in its longitudinal direction, a motor, a capacitance sensor, and a headrest control portion that controls the motor. The headrest control portion executes a forward drive control in which the headrest starts to be driven forward in response to a start-up signal from the PCS-ECU and the motor is stopped in response to the positional relation between the occupant's head and the headrest reaching a predetermined positional relation. After the forward drive control, the headrest control portion executes a hold control in which the motor is held in a stopped state for a predetermined hold time. After the hold control, the headrest control portion executes a backward drive control in which the headrest is driven backward.

15 Claims, 9 Drawing Sheets

U.S. PATENT DOCUMENTS

2007/0052265 A1    3/2007    Sakai

FOREIGN PATENT DOCUMENTS

| JP | 2005-87650 | 4/2005 |
|---|---|---|
| JP | 2005-177227 | 7/2005 |
| JP | 2005-193389 | 7/2005 |
| JP | 2006-27593 | 2/2006 |
| JP | 2006-160152 | 6/2006 |
| JP | 2006-321450 | 11/2006 |

OTHER PUBLICATIONS

Japanese Office Action dated Jun. 10, 2008.
German Office Action dated Apr. 16, 2009.

* cited by examiner

NORMAL

ACTIVATED

HEADREST CONTROL APPARATUS AND METHOD

INCORPORATION BY REFERENCE

The disclosure of Japanese Patent Application No. 2006-226837 filed on Aug. 23, 2006 including the specification, drawings and abstract is incorporated herein by reference in its entirety.

BACKGROUND OF THE INVENTION

1. Field of the Invention

The invention relates to a headrest control apparatus and a method for controlling an active headrest, which protect the occupant by moving the headrest forward prior to a collision with a following vehicle.

2. Description of the Related Art

A rear collision occupant protection apparatus is known which, when predicting a collision with a following vehicle, detects the position of the occupant's head using a senor in the headrest and moves the headrest forward to a position near the occupant's head (For example, refer to U.S. Pat. No. 5,694,320).

Such control for protruding the headrest (moving the headrest forward) is normally executed prior to the occurrence of a collision between the subject vehicle and a following vehicle after the same collision has been predicted to occur unavoidably. When such a predicted collision has been avoided or when the headrest has been moved unnecessarily, the headrest that has been moved forward interferes with the driver. However, none of the conventional headrest control apparatuses addresses the issue on when the headrest that has been moved forward needs to be returned to its initial position (moved back to its retracted position).

Further, in a state where two or more collisions may be predicted consecutively, it may be the case that a collision with a following vehicle is predicted immediately after a collision with other following vehicle, which was predicted previously, has been avoided. In such a case, if the occupant protection apparatus is adapted to move the headrest back from the forward position to the initial position at a fixed timing, the headrest may be held in the forward position for only a short period of time during the second predicted collision or the headrest may fail to be moved to near the occupant's head prior to the second predicted collision, resulting in an insufficient use of the occupant protection function (the function for reducing whiplash injuries) of the occupant protection apparatus.

SUMMARY OF THE INVENTION

In view of the above, the invention provides a headrest control apparatus and a method for controlling an active headrest, which, when a collision is newly predicted while the headrest is held in a given forward position, properly set the hold time of the headrest to cope with the impacts that may occur during or in relation to the newly predicted collision.

The first aspect of the invention relates to a headrest control apparatus, including: a rear state detection device that detects a following vehicle; a collision determination device that determines, based on the result of the detection by the rear state detection device, whether the possibility of collision between the following vehicle and a subject vehicle is high and outputs a start-up signal if the possibility of collision is high; a headrest drive mechanism that supports a headrest and drives the headrest relative to the subject vehicle in the longitudinal direction of the subject vehicle; a motor that produces a force for driving the headrest in the longitudinal direction; a head position detection device that detects the position of the head of an occupant relative to the headrest; and a headrest control portion that controls the longitudinal position of the headrest by activating the motor in accordance with the output of the collision determination device. According to this headrest control apparatus, the headrest control portion executes a forward drive control that starts to drive the headrest forward by activating the motor in response to the start-up signal from the collision determination device and then finishes the forward drive of the headrest by stopping the motor when detecting, from the signals from the head position detection device, that the positional relation between the head of the occupant and the headrest has reached a predetermined positional relation, the headrest control portion, after the forward drive control, executes a hold control that holds the motor in a stopped state for a predetermined hold time, and the headrest control portion, after the hold control, executes a backward drive control that drives the headrest backward by activating the motor to rotate in a reverse direction.

The headrest control apparatus according to the first aspect of the invention may be such that, when the head position detection device has detected the occupant's head as being at a predetermined position relative to the occupant's head or when the continuous operation time of the motor has reached a first reference time, the positional relation between the occupant's head and the headrest is determined to have reached a predetermined positional relation and the motor is then stopped to finish the forward drive of the headrest. Further, the headrest control apparatus according to the first aspect of the invention may be such that, when the continuous reverse operation time of the motor has reached a second reference time during the backward drive control, the motor is stopped to finish the backward drive of the headrest.

The second aspect of the invention relates to the headrest control apparatus according to the first aspect of the invention, wherein, when receiving the start-up signal again from the collision determination device during the hold control for the headrest, the headrest control portion continues the hold control by extending the predetermined hold time. According to this structure, even when a collision is newly predicted during the hold control for the headrest, the hold time of the headrest can be properly set to cope with the impacts that may occur during or in relation to the newly predicted collision.

The third aspect of the invention relates to the headrest control apparatus according to the second aspect of the invention, wherein, when receiving the start-up signal again from the collision determination device during the hold control, the headrest control portion resets the count of the present hold time and starts counting a new hold time.

The fourth aspect of the invention relates to the headrest control apparatus according to the first aspect of the invention, wherein, when receiving the start-up signal again from the collision determination device during the backward drive control, the headrest control portion discontinues the backward drive control and starts the forward drive control. According to this structure, even when a collision is newly predicted during the backward drive control for the headrest, the headrest can be immediately moved back to a given forward position to cope with the impacts that may occur during or in relation to the newly predicted collision.

The fifth aspect of the invention relates to a method for controlling an active headrest including a headrest drive mechanism that supports a headrest and drives the headrest relative to a subject vehicle in the longitudinal direction of the subject vehicle and a motor that produces a force for driving the headrest in the longitudinal direction. The method includes: a rear state detection step in which a following vehicle is detected; a collision determination step in which whether the possibility of collision between the following vehicle and the subject vehicle is high is determined based on the result of the detection in the rear state detection step, and if the possibility of collision is high, a start-up signal is output; a forward drive step in which, in response to the start-up signal from the collision determination step, the motor is activated to drive the headrest forward until the positional relation between the head of an occupant and the headrest reaches a predetermined positional relation; a hold step in which, after the forward drive step, the motor is held in a stopped state for a predetermined hold time; and a backward drive step in which, after the hold step, the motor is rotated in a reverse direction to drive the headrest backward.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, exemplary embodiments of the invention will be described with reference to the accompanying drawings.

Figure 1:
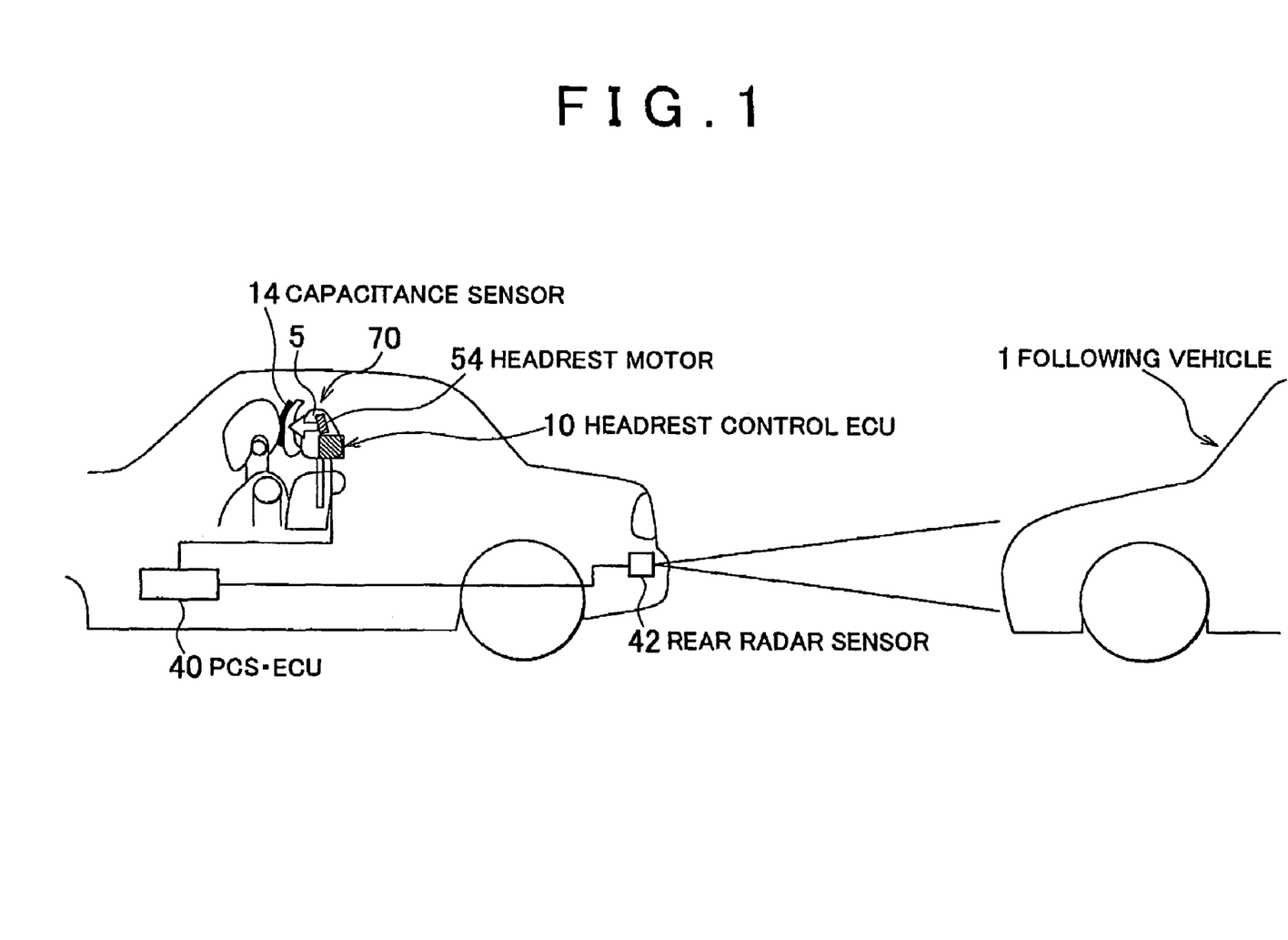
FIG. 1 is a view showing the configuration of a headrest control apparatus according to an exemplary embodiment of the invention.
Figure 2A:
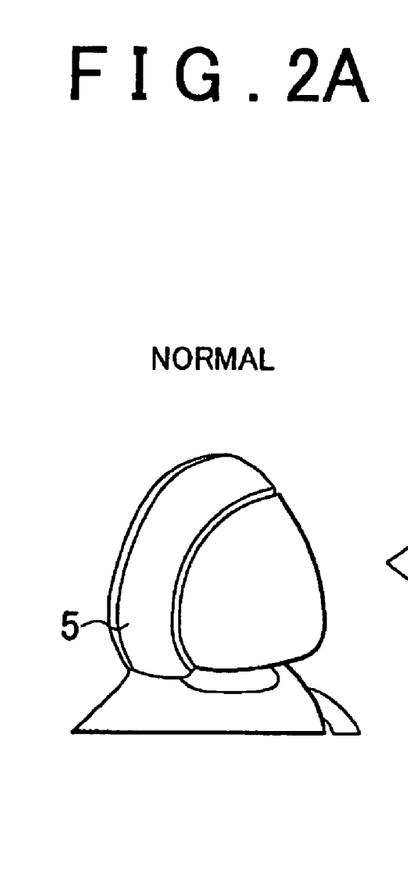
FIG. 2A is a view showing a state where a headrest 5 in is the normal position and FIG. 2B is a view showing a state where the headrest 5 has been moved to a forward position.
Figure 2B:
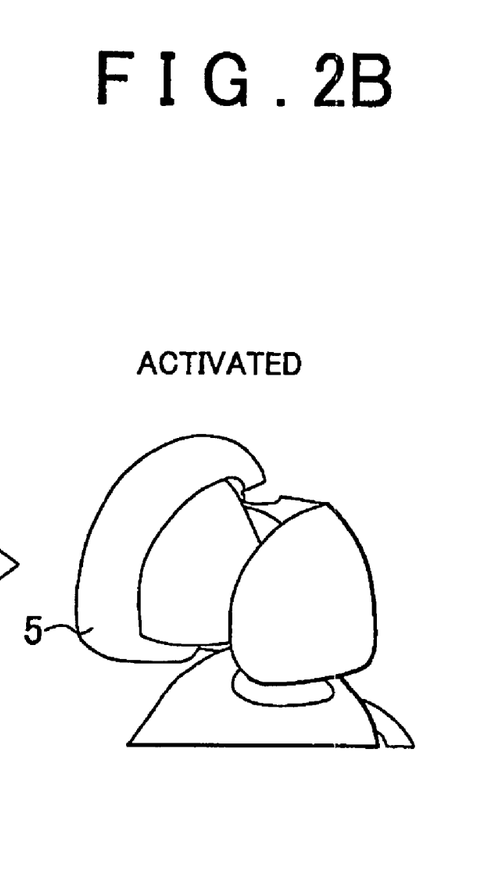
Figure 3:
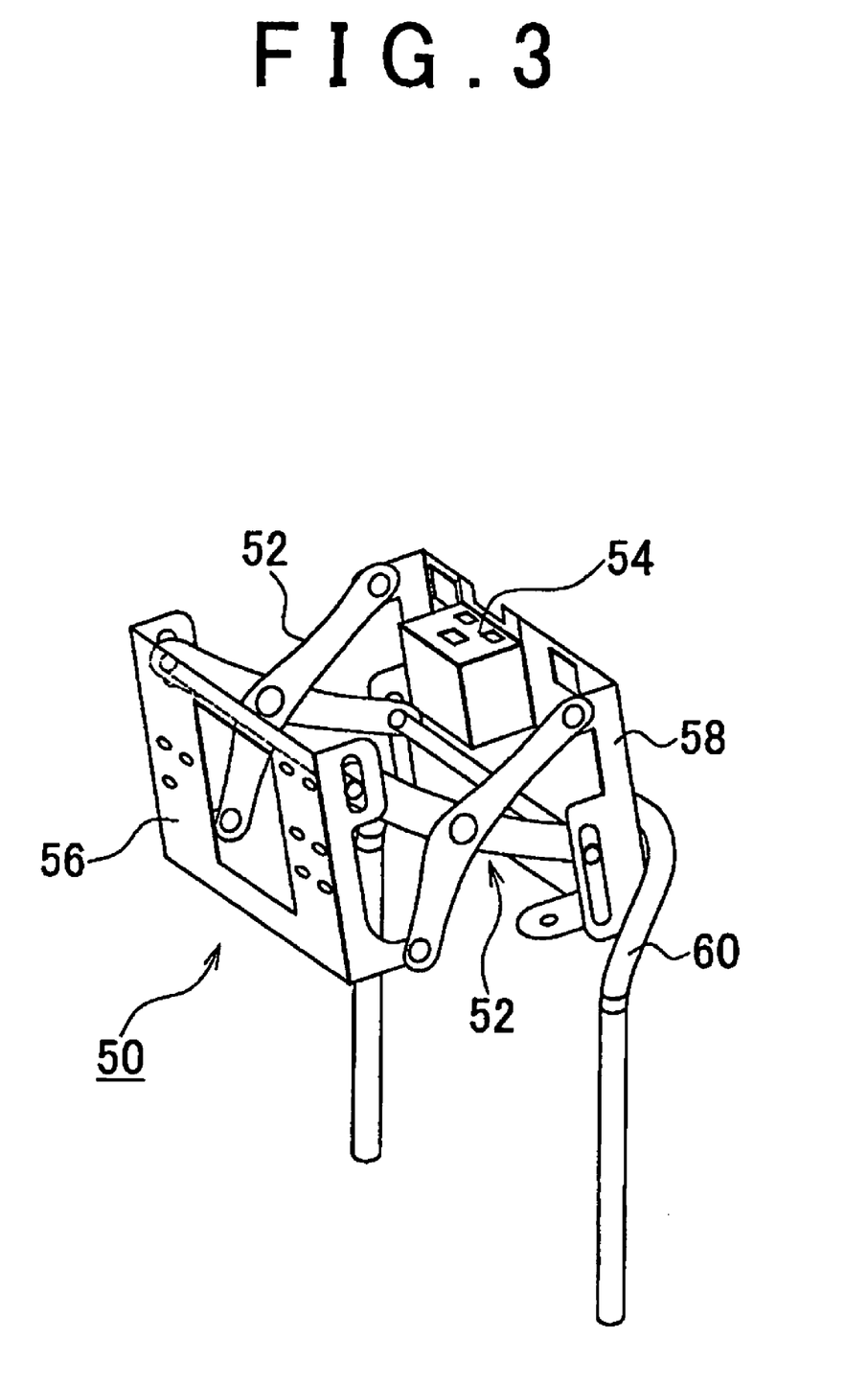
FIG. 3 is a perspective view of a headrest drive mechanism for the headrest 5.

FIG. 1 is a view showing the configuration of a headrest control apparatus according to an exemplary embodiment of the invention. In FIG. 1, the main components of the headrest control apparatus are shown in a side view of the vehicle. FIG. 2A is a view showing a state where a headrest 5 in is the normal position (in the retracted position), and FIG. 2B is a view showing a state where the headrest 5 has been moved to a given forward position. FIG. 3 is a perspective view of a headrest drive mechanism 50 of an active headrest unit 70.

The headrest control apparatus of this exemplary embodiment has, as its central component, an electronic control unit 10 (will hereinafter be referred to as "headrest control ECU 10") that controls the operation of the active headrest unit 70. Like other ECUs, the headrest control ECU 10 is consisted by a microcomputer having a CPU (Central Processing Unit), a ROM (Read Only Memory), a RAM (Random Access Memory), and other components, which are all connected to each other via communication buses, not shown in the drawings.

The active headrest unit 70 is provided with the headrest 5 and the headrest drive mechanism 50 (refer to FIG. 3). Like ordinary headrests, the headrest 5 is installed on the seat and set at the height corresponding to the back of the occupant's head so that the head of the occupant is supported by the headrest 5 from behind. The headrest 5 of the active headrest unit 70, as shown in FIG. 2A and FIG. 2B, is movable in the longitudinal direction of the vehicle. More specifically, the headrest 5 moves forward and backward relative to the vehicle in its longitudinal direction by being driven by a headrest motor 54 that rotates in both forward and reverse directions. Note that other reversible actuator may be used instead of the headrest motor 54. Although the headrest 5 is structured to move obliquely in the longitudinal direction of the vehicle in the example illustrated in FIG. 2A and FIG. 2B, the headrest 5 may alternatively be structured to move straight in the longitudinal direction of the vehicle, for example.

In the example illustrated in FIG. 3, the headrest drive mechanism 50 of the active headrest unit 70 has a stay 60, a stationary support member 58 that is fixed to the seat back via the stay 60, a pair of left and right X-arms (X-links) 52, a movable support member 56 that is supported by the stationary support member 58 via the X-arms 52 such that the movable support member 56 is movable in the longitudinal direction of the vehicle. As shown in FIG. 2A and FIG. 2B, a cushion that directly contacts the back of the occupant's head is attached to the movable support member 56, whereby the headrest 5 is formed. The X-arms 52 are connected to the output shaft of the headrest motor 54 via gears, not shown in the drawings, so that the X-arms 52 extend and retract by being driven by the headrest motor 54. More specifically, as the headrest motor 54 rotates in the forward and reverse directions, the X-arms 52 extend and retract, whereby the headrest 5 moves relative to the vehicle in its longitudinal direction. The forward travel of the headrest 5 can be varied by controlling the operation amount of the headrest motor 54, and the speed at which to move the headrest 5 forward can be varied by controlling the operation speed (i.e., rotation speed) of the headrest motor 54. Note that, instead of the arm mechanism shown in the drawings, other headrest drive mechanisms, such as those having a rack-and-pinion mechanism, a ball-screw-and-nut mechanism, etc., may be used as the headrest drive mechanism.

Referring again to FIG. 1, a capacitance sensor 14 is connected to the headrest control ECU 10. The capacitance sensor 14 is embedded in the headrest 5. More specifically, the capacitance sensor 14 is arranged in a predetermined portion in the headrest 5. For example, the capacitance sensor 14 may be arranged in the headrest 5 such that its sensing area covers the effective support portion of the headrest 5 (i.e., the portion of the headrest 5 that normally contacts the rear of the occupant's head when the headrest 5 is supporting the rear of the occupant's head). The capacitance sensor 14 outputs electric signals corresponding to the capacitance between the portion of the headrest 5 in the effective support portion and the portion of the occupant's head. The output signals of the capacitance sensor 14 are provided to the headrest control ECU 10.

A PCS-ECU (Pre-Crash-System ECU) 40 is connected to the headrest control ECU 10 via a given communication bus, such as a CAN (Controller Area Network). The PCS-ECU 40 determines whether the following vehicle is going to collide with the subject vehicle from behind unavoidably.

A rear radar sensor 42 is connected to the PCS-ECU 40. The rear radar sensor 42 detects the state of the following vehicle using detection waves, such as electric waves (e.g., millimeter waves), light waves (e.g., laser), and ultrasonic waves. That is, the rear radar sensor 42 continues to obtain, at predetermined time intervals, the information regarding the relation between the following vehicle and the subject vehicle, which may include the speed of the following vehicle relative to the subject vehicle and the relative distance from the subject vehicle to the following vehicle. When the rear radar sensor 42 is a millimeter radar sensor, for example, the rear radar sensor 42 may be adapted to use the dual-frequency CW (Continuous Wave) technique to detect the relative speed of the following vehicle and the relative distance to the following vehicle. In this case, for example, the rear radar sensor 42 detects the relative speed of the following vehicle using Doppler frequencies of electric waves and detects the relative distance to the following vehicle from the information regarding the phases of the two frequencies. Further, the rear radar sensor 42 may be adapted to detect the azimuth of the following vehicle by radiating beams one-dimensionally or two-dimensionally. Such detection data is all transmitted to the PCS-ECU 40 at given time intervals.

Using the information obtained from the rear radar sensor 42, the PCS-ECU 40 determines the relation (relative speed, distance, azimuth, etc.) between the subject vehicle and the following vehicle, and the PCS-ECU 40 then, based on the result of the determination, determines whether the following vehicle is going to collide with the subject vehicle unavoidably. As this type of determination method, various methods have been proposed in the technical field for frontal collision detection, and therefore such related determination logics and algorithms may be used as needed. For example, a detection technique may be used which, when a vehicle is approaching the subject vehicle from behind, estimates the time to a collision between the subject vehicle and the following vehicle (=relative distance/relative speed) and determines the collision with the following vehicle as being unavoidable when the estimated time to the collision reaches a predetermined value.

When the PCS-ECU 40 determines that the following vehicle is going to collide with the subject vehicle unavoidably, the PCS-ECU 40 switches a rear collision detection flag from "False (OFF)" to "True (ON)" (i.e., turns on the rear collision detection flag). Then, the PCS-ECU 40 continues to monitor the relation between the subject vehicle and the following vehicle. If the predicted collision has been avoided, the PCS-ECU 40 turns off the rear collision detection flag.

The headrest control ECU 10 is adapted to execute a headrest forward drive control in response to a start-up signal from the PCS-ECU 40 (the signal indicating the state of the rear collision detection flag). In the headrest forward drive control, the headrest control ECU 10 activates the headrest motor 54 in response to the start-up signal from the PCS-ECU 40 so that the headrest 5 starts moving forward, and the headrest control ECU 10 stops the headrest motor 54 when the headrest control ECU 10 determines, from the detection signals from the capacitance sensor 14, that the positional relation between the head of the occupant and the headrest 5 has reached a predetermined positional relation. Further, the headrest control ECU 10 is adapted to execute, after the headrest forward drive control, a headrest hold control in which the headrest motor 54 is stopped for a time $T_2$ (sec). Further, the headrest control ECU 10 is adapted to execute, after the headrest hold control, a headrest backward drive control in which the headrest motor 54 is rotated in the reverse direction so that the headrest 5 moves backward.

The control executed by the headrest control ECU 10 will be described with reference to several examples.

(First Exemplary Control)

Figure 4:
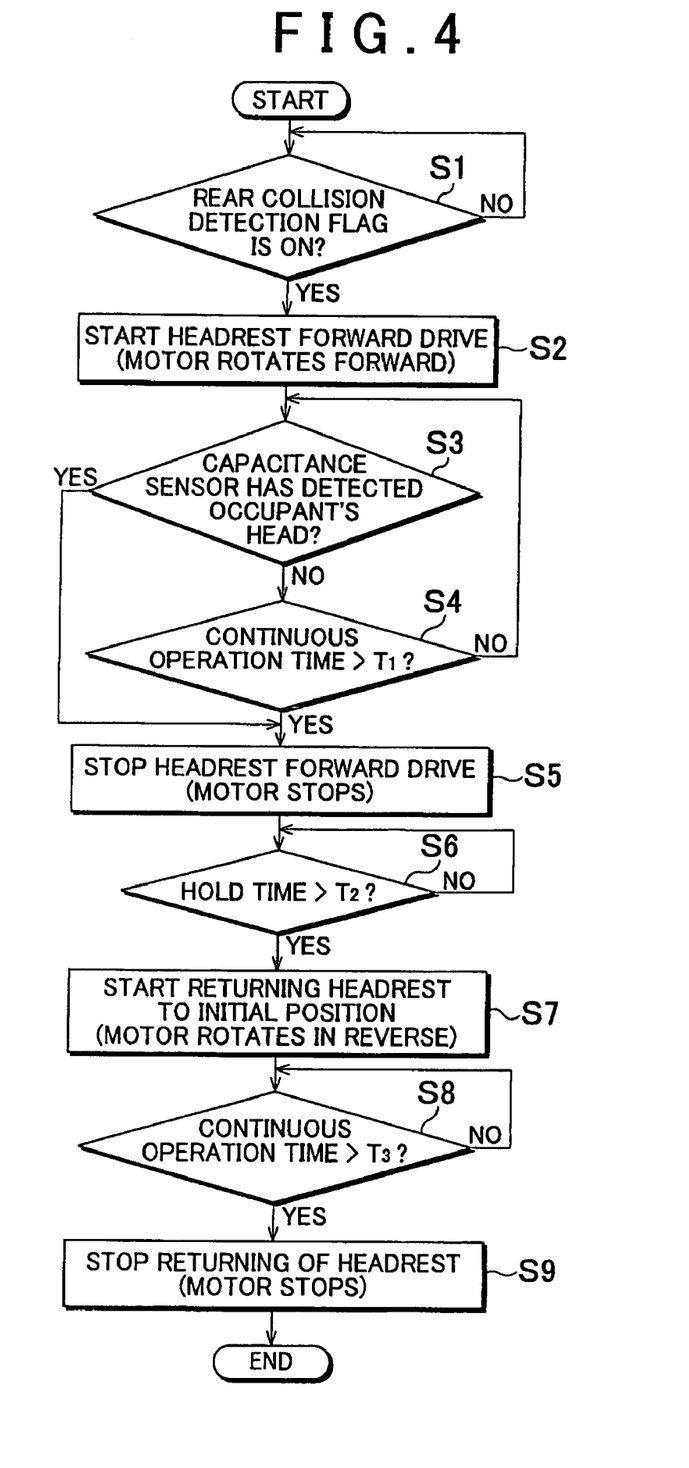
FIG. 4 is a flowchart showing an exemplary control routine executed by a headrest control ECU 10.

FIG. 4 is a flowchart showing an exemplary control routine executed by the headrest control ECU 10. This control routine may be repeatedly executed at given time intervals during the time period from the ignition of the vehicle being turned on to it being turned off.

In step 1, the headrest control ECU 10 determines whether the rear collision detection flag is ON. As described above, the rear collision detection flag is turned on when the PCS-ECU 40 determines that the possibility of collision between the subject vehicle and a following vehicle is high. If the rear collision detection flag is ON, the headrest control ECU 10 proceeds to step 2. If the rear collision detection flag is OFF, conversely, the headrest control ECU 10 repeats the process in step 1 until the rear collision detection flag is turned on.

In step 2, the headrest control ECU 10 activates the headrest motor 54 so that the headrest 5 starts moving forward (i.e., the start of the headrest forward drive control). That is, in response to the rear collision detection flag being turned on, the headrest control ECU 10 activates the headrest motor 54 to rotate in the forward direction so that the headrest 5 starts moving from its retracted position (refer to FIG. 2A) toward a given forward position (refer to FIG. 2B).

During the headrest forward drive control, the headrest control ECU 10 monitors the signals from the capacitance sensor 14 and determines whether the capacitance sensor 14 has detected the head of the occupant, that is, whether the headrest 5 has reached a proper position relative to the head of the occupant (step 3). For example, whether the capacitance sensor 14 has detected the head of the occupant can be determined based on whether the capacitance (absolute capacitance or relative capacitance) of the capacitance sensor 14 has reached a value corresponding to the position of the headrest 5 that is proximal to the head of the occupant. For example, a determination method may be used in which the headrest 5 is determined to have reached the proper position relative to the head of the occupant when the capacitance count number N of the capacitance sensor 14 exceeds a predetermined value. Note that the capacitance count number N is the ratio of the output value $C_O$ of the capacitance sensor 14 to a reference capacitance $C_S$. Further, a determination method may be used in which the gradient B of change in the capacitance of the capacitance sensor 14 (B=dN/dt) is calculated from the signals from the capacitance sensor 14, and the headrest 5 is determined to have reached the proper position relative to the head of the occupant when the capacitance count change gradient B exceeds a predetermined threshold. Further, a determination method may be used in which a touch sensor for detecting a contact between the headrest 5 and the head of the occupant is used instead of or in addition to the capacitance sensor 14, and the headrest 5 is determined to have reached the proper position relative to the head of the occupant when the touch sensor detects a contact between the headrest 5 and the head of the occupant.

If it is determined in step 3 that the capacitance sensor 14 has detected the head of the occupant, the headrest control ECU 10 proceeds to step 5. If not, the headrest control ECU 10 proceeds to step 4.

In step 4, the headrest control ECU 10 determines whether the time of the headrest forward drive control, that is, the time for which the headrest motor 54 has been running continuously to move the headrest 5 forward has exceeded a time $T_1$ (sec). This determination process serves as a timer for monitoring the continuous operation time of the headrest motor 54. The time $T_1$ is set to a value that prevents the headrest 5 from moving forward excessively. For example, the time $T_1$ may be set to 1 sec. In the case where the forward drive speed of the headrest 5 is variable, the time $T_1$ may be varied in accordance with the drive speed of the headrest 5, for example, such that the faster the headrest 5 is driven forward, the shorter the time $T_1$. If it is determined in step 4 that the continuous operation time of the headrest motor 54 has exceeded the time $T_1$, the headrest control ECU 10 proceeds to step 5.

In step 5, the headrest control ECU 10 stops the forward drive of the headrest 5 by stopping the headrest motor 54 (finishes the headrest forward drive control). That is, in this step, the headrest control ECU 10 stops the protruding motion of the headrest 5 toward the forward position (refer to FIG. 2B). The headrest forward drive control is finished before the beginning of the collision at latest. At the time of stopping the headrest motor 54, the headrest control ECU 10 starts counting the time from this point.

In step 6, the headrest control ECU 10 determines whether the time from the stop of the headrest motor 54, that is, the time for which the headrest motor 54 has been stopped has reached a hold time $T_2$ (sec) (headrest hold control). The hold time $T_2$ is long enough for the headrest 5, which is held in a given forward position, to restrain the backward movement of the head of the occupant for a certain period of time during the upcoming collision. Meanwhile, if the predicted collision has been avoided, the driver who wishes to maintain his or her proper driving position would find the position of the protruding headrest 5 improper, and therefore the reference time $T_2$ should not be too long. For example, in the case where the headrest control ECU 10 is adapted to finish the headrest forward drive control immediately before the beginning of the predicted collision, the hold time $T_2$ may be set to approx. 2 sec, for example. When the hold time $T_2$ is set to approx. 2 sec, even if there is a time difference between the end of the actual headrest forward drive control and the beginning of the collision, the time difference can be absorbed, so that the backward movement of the head of the occupant can be kept restrained by the headrest 5 for a certain period of time. On the other hand, in the case where the headrest control ECU 10 is adapted to finish the headrest forward drive control well before the beginning of the predicted collision, the hold time $T_2$ may be set long correspondingly.

If it is determined in step 6 that the headrest motor 54 has been stopped for the hold time $T_2$ or longer, the headrest control ECU 10 then proceeds to step 7.

In step 7, the headrest control ECU 10 controls the headrest motor 54 to rotate in the reverse direction so that the headrest 5 moves back to the retracted position (headrest backward drive control). That is, the headrest control ECU 10 controls the headrest motor 54 to rotate in the reverse direction so that the headrest 5 returns from the forward position (refer to FIG. 2B) to the retracted position (refer to FIG. 2A), which is the initial position of the headrest 5.

During the above-described headrest backward drive control, the headrest control ECU 10 monitors the continuous operation time of the headrest motor 54 and determines whether the continuous operation time of the headrest motor 54 has exceeded a time $T_3$ (sec) (step 8). This determination process serves as a timer for monitoring the continuous operation time of the headrest motor 54. The time $T_3$ is long enough for the headrest 5 to return to the retracted position after moving to the forward end. For example, the time $T_3$ may be set to 2 sec. If it is determined in step 8 that the continuous operation time of the headrest motor 54 has exceeded the time $T_3$, the headrest control ECU 10 then proceeds to step 9.

In step 9, the headrest control ECU 10 stops the headrest motor 54 so that the headrest 5 stops moving backward. That is, the headrest control ECU 10 stops the returning motion of the headrest 5 toward the retracted position (refer to FIG. 2A) that is the initial position of the headrest 5. After stopping the headrest motor 54, the headrest control ECU finishes the control routine for the present event (the event that the rear collision detection flag has been turned on).

Figure 5:
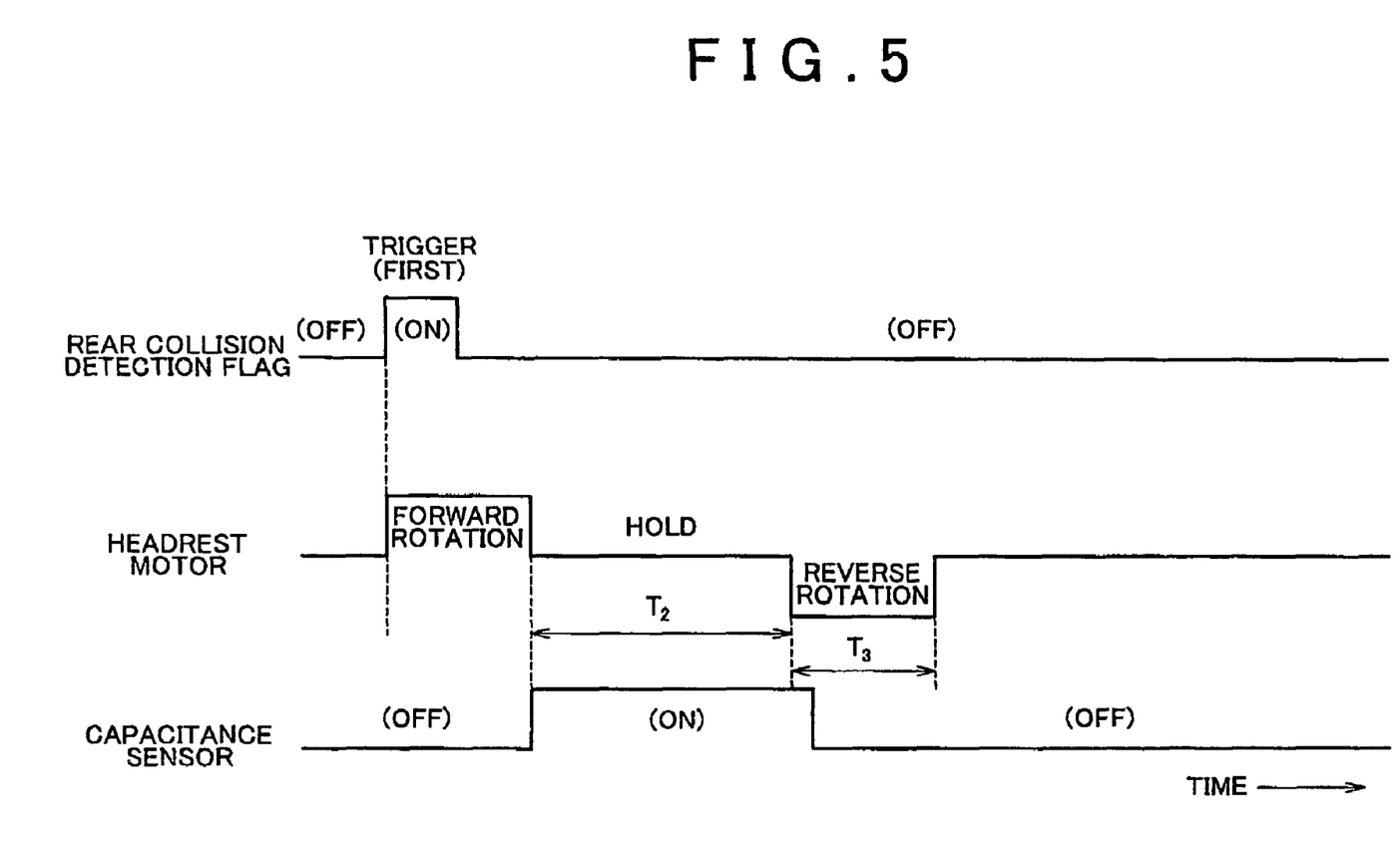
FIG. 5 is a time chart related to the control illustrated in FIG. 4.

FIG. 5 shows time charts related to the control illustrated in FIG. 4. The upper chart illustrates the state (ON or OFF) of the rear collision detection flag. The middle chart illustrates the operation state of the headrest motor 54. The lower chart illustrates the state of the occupant's head detection by the capacitance sensor 14 (ON or OFF). The example illustrated in FIG. 5 shows a case where the rear collision detection flag is once turned on in response to an unavoidable collision being predicated and it is then turned off in response to the predicted collision being avoided, that is, no collision occurs.

As shown in FIG. 5, the headrest forward drive control for the headrest 5 starts in response to the rear collision detection flag being turned on, and the headrest forward drive control ends in response to the head of the occupant being detected by the capacitance sensor 14, and then the headrest hold control for the headrest 5 is executed for the hold time $T_2$, and the headrest backward drive control is then executed upon elapse of the hold time $T_2$. Note that once the rear collision detection flag is turned on, the control routine continues (is not discontinued) even if the rear collision detection flag is later turned off before the end of the control routine.

According to the first exemplary control, as described above, after the rear collision detection flag is turned on in response to an unavoidable collision being detected, the headrest forward drive control, the headrest hold control, and the headrest backward drive control are executed at appropriate timings. As such, in the event that the predicted collision actually occurs unlike in the example illustrated in FIG. 5, the head of the occupant can be appropriately protected due to the headrest hold control in which the headrest 5 is held in a given forward position for an appropriate period of time. Further, because the headrest 5 is brought back to the retracted position, which is the initial position of the headrest 5, by the headrest backward drive control that is performed at an appropriate timing after the headrest hold control, even if the predicted collision has been avoided, the headrest 5 is not held long time in the forward position that the driver would find improper at this time. Note that, for example, an unavoidable collision predicted by the PCS-ECU 4 could be avoided due to unpredicted changes in the surrounding conditions, such as the motion of the following vehicle for avoiding the collision with the subject vehicle (e.g., hard braking, hard turning).

In the exemplary control routine shown in FIG. 4, the time to start the headrest backward drive control, that is, the time to finish the headrest hold control in which the headrest 5 is held in a given forward position is determined based on the time counted from when the headrest motor 54 is stopped. However, it may alternatively be determined based on the time counted from when the rear collision detection flag is turned on (when a collision is predicted). In this case, the hold time $T_2$ is extended by an amount corresponding to the time needed for executing the headrest forward drive control or by an amount corresponding to the time $T_1$.

(Second Exemplary Control)

Figure 6:
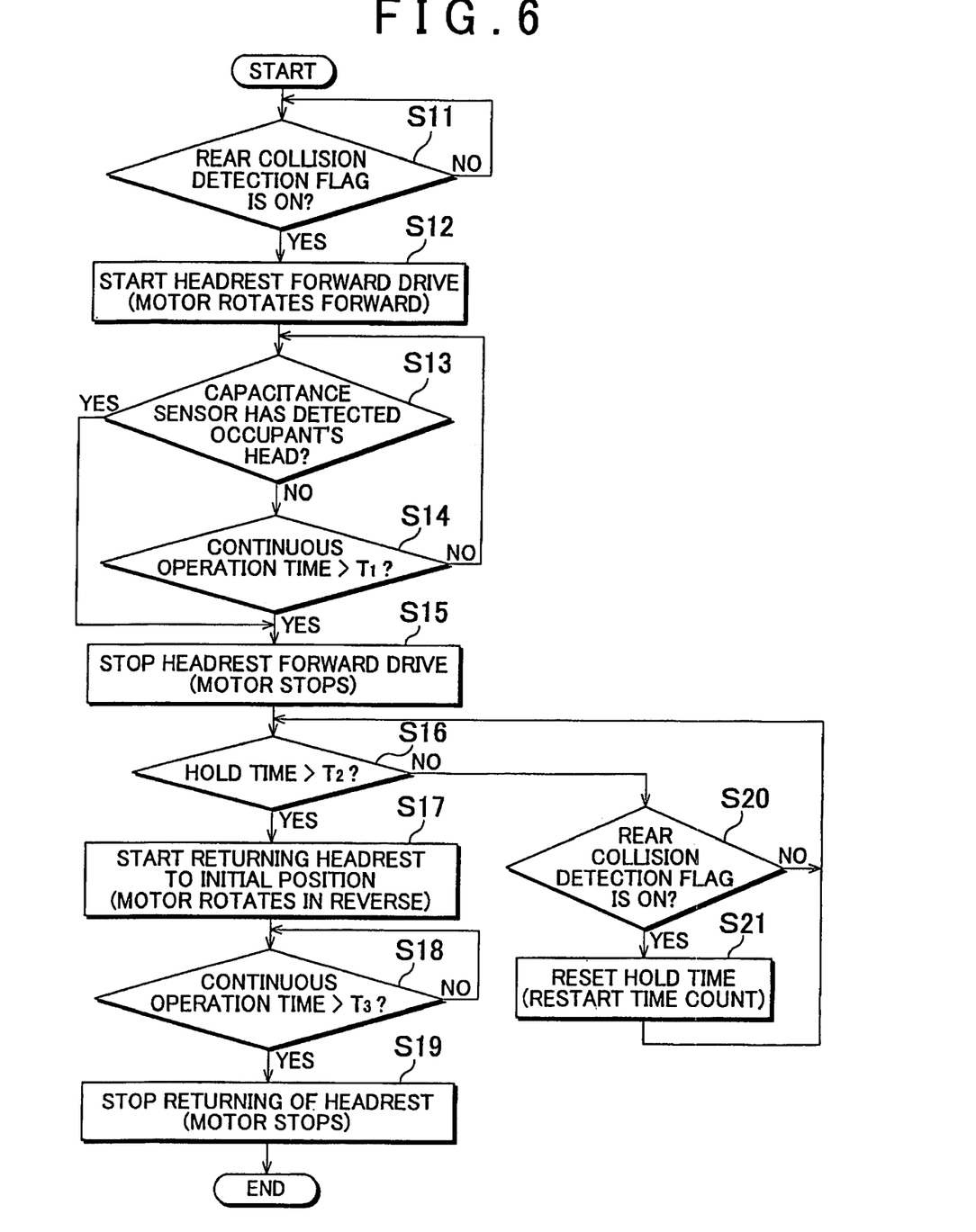
FIG. 6 is a flowchart showing another exemplary control routine executed by a headrest control ECU 10.

FIG. 6 is a flowchart showing another exemplary control routine executed by the headrest control ECU 10. This control routine, for example, is repeatedly executed at given time intervals during the time period from the ignition switch of the vehicle being turned on to it being turned off.

Note that the processes in steps 11, 12, 13, 14, 15, 17, 18, 19 of the control routine in FIG. 6 are the same as those in steps 1, 2, 3, 4, 5, 7, 8, 9 of the control routine in FIG. 4, and therefore their descriptions will be omitted.

In step 16, the headrest control ECU 10 determines whether the headrest motor 54 has been stopped for the time $T_2$ (sec) or longer (the headrest hold control). If it is determined in step 16 that the headrest motor 54 has been stopped for the time $T_2$ or longer, the headrest control ECU 10 then proceeds to step 17. On the other hand, if it is determined in step 16 that the headrest motor 54 has not yet been stopped for the time $T_2$ or longer, the headrest control ECU 10 then proceeds to step 20.

In step 20, the headrest control ECU 10 detects the state of the rear collision detection flag and determines whether the rear collision detection flag has been turned on again. Note that, for example, the rear collision detection flag is consecutively turned on in a state of multiple collisions. A typical example of the case where the rear collision detection flag is consecutively turned on is that the rear collision detection flag is turned on for the first time in response to an unavoidable collision with a following vehicle being predicted, and this predicted collision is however avoided, and an unavoidable collision with another following vehicle is then predicted.

If it is determined in step 20 that the rear collision detection flag has been turned on again, the headrest control ECU 10 proceeds to step 21. If not, the headrest control ECU 10 returns to step 16.

In step 21, in response to the rear collision detection flag being turned on again, the headrest control ECU 10 resets (zeros) the present hold time that has been counted so far and restarts counting a new hold time. By doing so, the headrest control ECU 10 extends the execution time of the headrest hold control.

Figure 7:
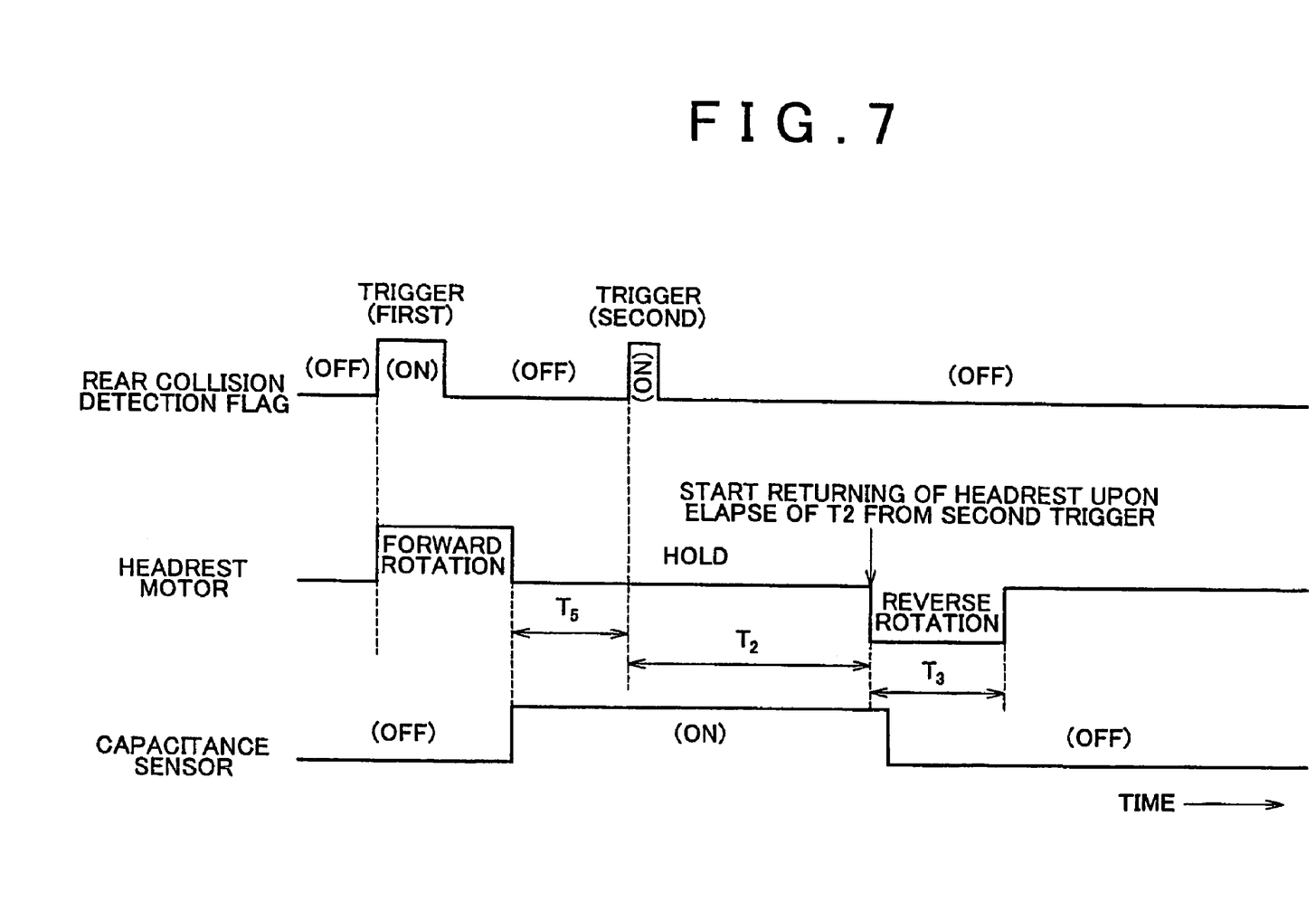
FIG. 7 is a time chart related to the control illustrated in FIG. 6.

FIG. 7 shows time charts related to the control routine illustrated in FIG. 6. The upper time chart illustrates the state of the rear collision detection flag (ON or OFF). The middle time chart illustrates the operation state of the headrest motor 54. The lower timechart illustrates the state of the occupant's head detection by the capacitance sensor 14. The example illustrated in FIG. 7 shows a case where the rear collision detection flag is turned on in response to a collision being predicted and then turned off in response to the predicted collision being avoided, and the rear collision detection flag is again turned on in response to another collision being predicted and then turned off in response to the predicted collision being avoided, that is, no collision occurs.

In the example illustrated in FIG. 7, more specifically, the headrest 5 is first moved forward in response to the rear collision detection flag being turned on for the first time, and the rear collision detection flag is again turned on during the headrest hold control for the headrest 5 (when a hold time $T_5$ that is shorter than the hold time $T_2$ has passed), and in response to this (second trigger), the hold time period is extended (refer also to FIG. 5 for comparison). That is, consequently, the hold time is extended from $T_2$, which is the initial setting, to $T_5+T_2$. Meanwhile, because the rear collision detection flag is not turned on for the third time in the example illustrated in FIG. 7, the headrest 5 is held in the forward position for the hold time $T_5+T_2$ and then returned to the initial position upon elapse of the hold time $T_5+T_2$.

As such, in a state where two or more rear collisions occur consecutively, the second exemplary control minimizes the possibility that the hold time for holding the headrest 5 would be shortened to an extent that the restraint of the head of the occupant becomes insufficient. That is, in the case where the hold time is not changed in accordance with the subsequent state of the rear collision detection flag, if the second predicted collision actually occurs unlike in the example illustrated in FIG. 7, the hold time of the headrest 5 for the second predicted collision becomes short. On the other hand, according to the second exemplary control, even if the second predicted collision actually occurs unlike in the example illustrated in FIG. 7, the hold time is extended such that the head of the occupant can be appropriately protected. Also, as in the case of the first exemplary control described above, by extending the hold time $T_2$ properly, it is possible to minimize or eliminate the possibility that, when a predicted collision has been avoided, the headrest 5 would be held long time in the forward position that the driver would surely find improper at this time.

In the second exemplary control shown in FIG. 7, the time to start the counting of the hold time in response to the rear collision detection flag being turned on for the first time is when the headrest motor 54 is stopped. Alternatively, the counting of the hold time may be started from when the rear collision flag is turned on for the first time (when a collision is predicted). In this case, the hold time $T_2$ is set to a value reflecting the change of the time to start the time count.

Further, in the second exemplary control described above, the second hold time is set after the first hold time $T_2$ is reset in response to the rear collision detection flag being turned on for the second time may be set longer than the first hold time $T_2$ that has been set in response to the rear collision detection flag being turned on for the first time. That is, because the first hold time $T_2$ for the first predicted collision is set with respect to the time at which the rear collision detection flag was turned on for the first time and by factoring in the time needed for the forward drive of the headrest 5 (refer to FIG. 5), if the first hold time that has been set in response to the rear collision detection flag being turned on for the first time is reset, the time set for the forward drive of the headrest 5 is also cleared. Therefore, the second hold time needs to be made longer than the first hold time by an amount corresponding to the time for the forward drive of the headrest 5.

(Third Exemplary Control)

Figure 8:
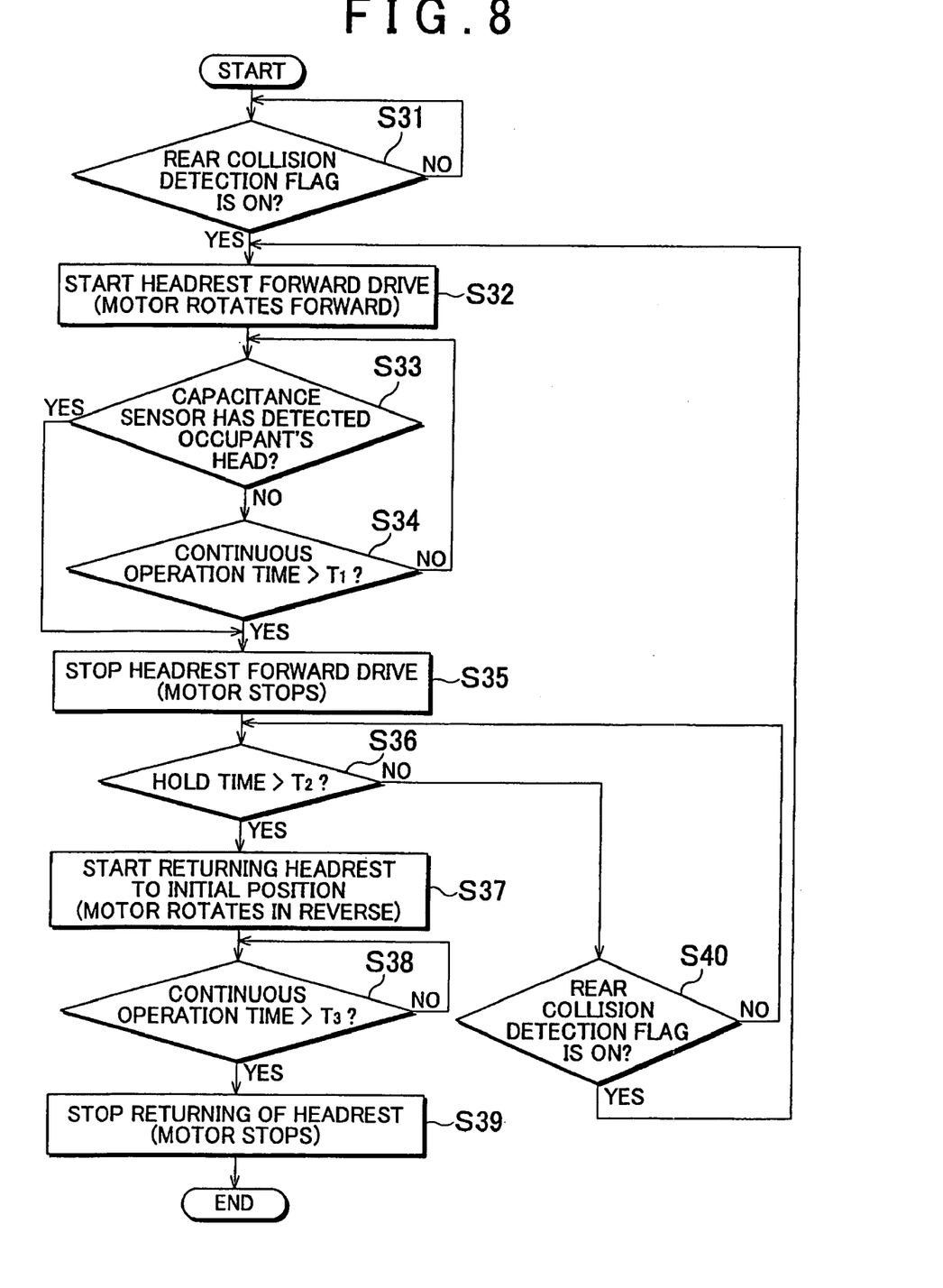
FIG. 8 is a flowchart showing still another exemplary control routine executed by a headrest control ECU 10.

FIG. 8 is a flowchart illustrating another exemplary control routine executed by the headrest control ECU 10. This control routine, for example, is repeatedly executed at given time intervals during the time period from the ignition switch of the vehicle being turned on to it being turned off.

Note that the processes in steps 31, 32, 33, 34, 35, 36, 37, 38, 39 of the control routine in FIG. 6 are the same as those in steps 1, 2, 3, 4, 5, 6, 7, 8, 9 of the control routine in FIG. 4, and therefore their descriptions will be omitted.

The headrest control ECU 10 monitors the state of the rear collision detection flag during the headrest backward drive control. In step 40, the headrest control ECU 10 determines whether the rear collision detection flag has been turned on again during the headrest backward drive control. Note that, for example, the rear collision detection flag is consecutively turned on in a state of multiple collisions.

If it is determined in step 40 that the rear collision detection flag has been turned on again, the headrest control ECU 10 then proceeds to step 32. If not, conversely, the headrest control ECU 10 returns to step 38.

In step 32 executed after step 40, the headrest control ECU 10 immediately stops the reverse rotation of the headrest motor 54 and starts the headrest forward drive control. That is, when the rear collision detection flag is turned on again during the headrest backward drive control, the headrest control ECU 10 immediately starts the headrest forward drive control by reversing the rotation of the headrest motor 54.

Figure 9:
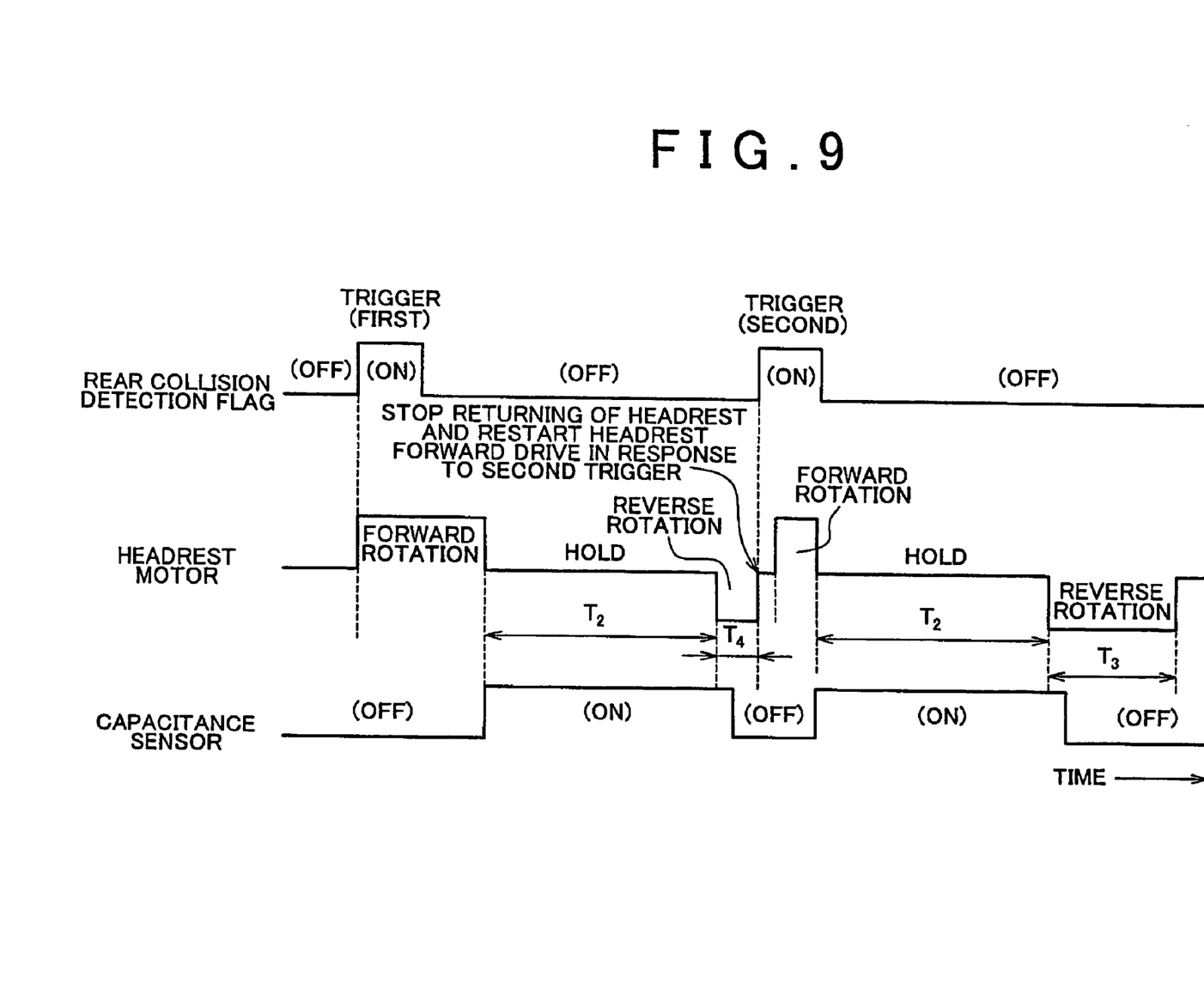
FIG. 9 is a time chart related to the control illustrated in FIG. 8.

FIG. 9 shows time charts related to the control routine illustrated in FIG. 8. The upper time chart illustrates the state of the rear collision detection flag (ON or OFF). The middle time chart illustrates the operation state of the headrest motor 54. The lower timechart illustrates the state of the occupant's head detection by the capacitance sensor 14. The example illustrated in FIG. 9 shows a case where the rear collision detection flag is turned on in response to a collision being predicted and then turned off in response to the predicted collision being avoided, and the rear collision detection flag is again turned on in response to another collision being predicted and then turned off in response to the predicted collision being avoided, that is, no collision occurs.

In the example illustrated in FIG. 9, more specifically, the headrest 5 is first moved forward in response to the rear collision detection flag being turned on for the first time, and the headrest 5 is then held in a given forward position for the hold time $T_2$, and the headrest 5 is returned to the initial position upon elapse of the hold time $T_2$, and the rear collision detection flag is turned on again while the headrest 5 is being returned to the initial position (upon elapse of a time $T_4$ that is shorter than the time $T_3$), and, in response to this (second trigger), the forward drive of the headrest 5 (the headrest forward drive control) is restarted (refer also to FIG. 5 for comparison). Meanwhile, because the rear collision detection flag is not turned on for the third time in the example illustrated in FIG. 9, the headrest 5 is held in the forward position for the hold time $T_2$ after the second forward drive and then starts to be returned toward the initial position upon elapse of the time $T_2$, and the returning is completed upon elapse of the time $T_3$.

As such, in a state where two or more rear collisions occur consecutively, the third exemplary control eliminates the possibility that the headrest 5 would fail to be in a given forward position (i.e., the headrest 5 would have been returned to the retracted position) when the subsequently predicted collision is actually occurring. That is, in the event that the second predicted collision actually occurs unlike in the example illustrated in FIG. 9, the headrest forward drive control is restarted to bring the headrest 5 back to the forward position, and therefore the head of the occupant can be properly protected by the headrest 5. Also, as in the case of the first exemplary control described above, by setting the hold time $T_2$ properly, it is possible to minimize or eliminate the possibility that, when a predicted collision has been avoided, the headrest 5 would be held long time in the forward position that the driver would surely find improper at this time.

Meanwhile, according to the third exemplary control, when the rear collision detection flag is turned on again after the headrest 5 has been returned to its initial position, this event is treated in step 31 in the next cycle of the control routine, followed by the processes in step 32 onward as described above.

Note that the third exemplary control can be implemented in combination with the second exemplary control.

While the invention has been described with reference to the exemplary embodiments thereof, it is to be understood that the invention is not limited to the exemplary embodiments. To the contrary, the invention is intended to cover various modifications and equivalent arrangements. In addition, while the various elements of the exemplary embodiments are shown in various combinations and configurations, which are exemplary, other combinations and configurations are also within the sprit and scope of the invention.

For example, while the headrest control ECU 10 is adapted to indirectly receive the start-up signals from the PCS-ECU 40 by referring to the state of the rear collision detection flag in the foregoing exemplary embodiments, the headrest control ECU 10 may alternatively be adapted to receive the start-up signals directly from the PCS-ECU 40.

Further, while the foregoing exemplary embodiments assume that the driver faces straight forward, other structure for determining the stop position of the headrest 5, such as the one that identifies the orientation of the driver's face using, for example, an in-vehicle camera and changes the stop position of the headrest 5 by changing the related thresholds in accordance with the orientation of the driver's face, may be additionally used.

Further, while the state in the rear of the subject vehicle is detected using the rear radar sensor 42 in the foregoing exemplary embodiments, the same state may alternatively be detected based on the information regarding the relation between the subject vehicle and other vehicle that is obtained from the other vehicle through a vehicle-to-vehicle communication. Also, a structure may also be incorporated which obtains image information from a stereo camera for capturing the view in the rear of the subject vehicle and detects, from this image information, the speed of the subject vehicle relative to the following vehicle, the distance from the subject vehicle to the following vehicle, the azimuth of the subject vehicle with respect to the following vehicle, and so on, and which determines, based on the detection results, whether the subject vehicle is going to collide with the following vehicle unavoidably. Note that the determination as to the collision with the following vehicle is not necessarily made between "YES" and "NO". For example, the possibility of the collision may be evaluated in multiple steps.

What is claimed is:

1. A headrest control apparatus, comprising:
  a rear state detection device that detects a following vehicle;
  a collision determination device that determines, based on the result of the detection by the rear state detection device, whether the possibility of collision between the following vehicle and a subject vehicle is high and outputs a start-up signal if the possibility of collision is high;
  a headrest drive mechanism that supports a headrest and drives the headrest relative to the subject vehicle in the longitudinal direction of the subject vehicle;
  a motor that produces a force for driving the headrest in the longitudinal direction;
  a head position detection device that detects the position of the head of an occupant relative to the headrest; and
  a headrest control portion that controls the longitudinal position of the headrest by activating the motor in accordance with the output of the collision determination device, wherein
    the headrest control portion executes a forward drive control that starts to drive the headrest forward by activating the motor in response to the start-up signal from the collision determination device and then finishes the forward drive of the headrest by stopping the motor when detecting, from the signals from the head position detection device, that the positional relation between the head of the occupant and the headrest has reached a predetermined positional relation,
    the headrest control portion, after the forward drive control, executes a hold control that holds the motor in a stopped state for a predetermined hold time, and continues the hold control by extending the predetermined hold time when receiving the start-up signal again from the collision determination device during the hold control, and the headrest control portion, after the hold control, executes a backward drive control that drives the headrest backward by activating the motor to rotate in a reverse direction.

2. The headrest control apparatus according to claim 1, wherein the headrest control portion stops the motor when the continuous operation time of the motor exceeds a first time period during the forward drive control.

3. The headrest control apparatus according to claim 2, wherein the headrest control portion sets the first time period in accordance with the speed at which the headrest is moved forward.

4. The headrest control apparatus according to claim 3, wherein the higher the speed at which the headrest is moved forward, the headrest control portion shortens the first time period.

5. The headrest control apparatus according to claim 1, wherein the headrest control portion stops the motor when the continuous operation time of the motor exceeds a second time period during the backward drive control.

6. The headrest control apparatus according to claim 5, wherein the headrest control portion sets the second time period to a time period that allows the headrest to return to a retracted position of the headrest.

7. The headrest control apparatus according to claim 1, wherein when receiving the start-up signal again from the collision determination device during the hold control, the headrest control portion resets the count of the present hold time and starts counting a new hold time.

8. The headrest control apparatus according to claim 1, wherein the headrest control portion continues the hold control until the predetermined hold time passes from when receiving the start-up signal again.

9. The headrest control apparatus according to claim 1, wherein when receiving the start-up signal again from the collision determination device during the backward drive control, the headrest control portion discontinues the backward drive control and starts the forward drive control.

10. The headrest control apparatus according to claim 1, wherein the headrest is driven forward in a substantially horizontal reference plane, and the headrest is driven backward in the substantially horizontal reference plane.

11. A method for controlling an active headrest including a headrest drive mechanism that supports a headrest and drives the headrest relative to a subject vehicle in the longitudinal direction of the subject vehicle and a motor that produces a force for driving the headrest in the longitudinal direction, the method comprising:
    detecting a following vehicle;
    outputting a start-up signal if the possibility of collision between the following vehicle and the subject vehicle is determined to be high based on the result of the following vehicle detection;
    activating, in response to the start-up signal, the motor to drive the headrest forward until the positional relation between the head of an occupant and the headrest reaches a predetermined positional relation;
    holding, after driving the headrest forward, the motor in a stopped state for a predetermined hold time; and
    activating, after holding the motor in a stopped state for the predetermined hold time, the motor to rotate in a reverse direction to drive the headrest backward,
    wherein when the start-up signal is output again while the motor is held in the stopped state, the predetermined hold time is extended so that the motor continues to be held in the stopped state.

12. The method according to claim 11, wherein when the start-up signal is output again while the motor is held in the stopped state, the count of the present hold time is reset and a new hold time starts to be counted.

13. The method according to claim 11, wherein when the start-up signal is output again, the motor continues to be held in a stopped state until the predetermined hold time passed from when receiving the start-up signal again.

14. The method according to claim 11, wherein when the start-up signal is output again while the headrest is being driven backward, the backward drive control is discontinued and the forward drive control is then started.

15. The method according to claim 11, wherein the motor drives the headrest forward in a substantially horizontal reference plane, and the motor drives the headrest backward in the substantially horizontal reference plane.

* * * * *